(12) United States Patent
Lawrence

(10) Patent No.: US 12,150,453 B2
(45) Date of Patent: Nov. 26, 2024

(54) FLATBREAD CUTTING SYSTEM

(71) Applicant: Lawrence Equipment Inc., South El Monte, CA (US)

(72) Inventor: Eric Clay Lawrence, Hungtington Beach, CA (US)

(73) Assignee: Lawrence Equipment, Inc., South El Monte, CA (US)

( * ) Notice: Subject to any disclaimer, the term of this patent is extended or adjusted under 35 U.S.C. 154(b) by 378 days.

(21) Appl. No.: 17/843,110

(22) Filed: Jun. 17, 2022

(65) Prior Publication Data

US 2023/0010399 A1    Jan. 12, 2023

Related U.S. Application Data

(60) Provisional application No. 63/220,238, filed on Jul. 9, 2021.

(51) Int. Cl.
  *A21C 11/10*    (2006.01)
(52) U.S. Cl.
  CPC .................................. *A21C 11/10* (2013.01)
(58) Field of Classification Search
  CPC .............................. A21C 11/10; A21C 15/04
  USPC .......................................................... 83/418
  See application file for complete search history.

(56) References Cited

U.S. PATENT DOCUMENTS

| | | | | |
|---|---|---|---|---|
| 3,890,453 A * | 6/1975 | Harmon | ................. | A21C 11/10 426/503 |
| 4,179,865 A * | 12/1979 | Pellaton | ................. | A21C 15/04 53/473 |
| 5,012,726 A * | 5/1991 | Fehr | ........................ | A21C 11/16 99/450.6 |
| 5,148,655 A * | 9/1992 | Salinas | ..................... | B26D 7/27 53/514 |
| 5,287,781 A * | 2/1994 | Fehr | ........................ | A21C 11/10 83/350 |
| 5,918,538 A * | 7/1999 | Rodriguez | ............. | A21C 15/04 99/489 |
| 6,318,224 B1 * | 11/2001 | Hoyland | .................. | B26D 7/32 83/155.1 |

(Continued)

OTHER PUBLICATIONS

[No Author Listed] [online], "Inline Tortilla Chip Cutting Machine—TC-200—FoodTools," Food Tools Industry Leaders in Portion Control, Sep. 16, 2021, retrieved on Oct. 19, 2022, <https://youtu.be/JbXPd1DBa2Q>, 3 pages [Video Submission].

(Continued)

*Primary Examiner* — Omar Flores Sanchez
(74) *Attorney, Agent, or Firm* — Fish & Richardson P.C.

(57) ABSTRACT

Methods, systems, and apparatus, including computer programs encoded on computer storage media, for cutting flatbread. One of the systems includes a lifting platform configured to move in a first direction to remove a flatbread stack from a conveyor along an axis, which conveyor transports the flatbread stack along a longitudinal axis that is substantially perpendicular to the axis; a transport arm configured to a) move in a first direction along the longitudinal axis to remove the flatbread stack from the lifting platform, and b) move in a second direction along the longitudinal axis to place the flatbread stack on a cutting pedestal; and the cutting pedestal configured to receive the flatbread stack from the transport arm and to support the flatbread stack for a subsequent cutting operation.

30 Claims, 11 Drawing Sheets

(56) References Cited

U.S. PATENT DOCUMENTS

| | | | | |
|---|---|---|---|---|
| 6,318,225 B1* | 11/2001 | Longoria | ................ | B26D 7/01 |
| | | | | 53/514 |
| 6,415,698 B1* | 7/2002 | Haas | ................ | A21C 11/10 |
| | | | | 83/639.1 |
| 8,513,571 B2* | 8/2013 | Gonzalez | ................ | A21B 3/07 |
| | | | | 99/393 |
| 2015/0135921 A1 | 5/2015 | Martinez-Montes | | |
| 2019/0216097 A1* | 7/2019 | Scherz | ................ | B26D 7/0625 |
| 2021/0402631 A1* | 12/2021 | Landi | ................ | A23P 10/25 |
| 2023/0277009 A1* | 9/2023 | Noja | ................ | B65B 43/265 |
| | | | | 99/325 |

OTHER PUBLICATIONS

FoodTools.com [online], "Inline Tortilla Slicer," available on or before Oct. 26, 2021, retrieved on Oct. 19, 2022, retrieved from URL <https://foodtools.com/product/tc-200/>, 4 pages.

FoodTools.com [online], "Tortilla and Pita Chip Cutting," available on or before Sep. 22, 2021, retrieved on Oct. 19, 2022, retrieved from URL <https://foodtools.com/product/tc-2/>, 4 pages.

\* cited by examiner

200

```
┌─────────────────────────────────────────────┐
│ Raise, by a lifting platform with a first   │
│ upper surface and in a first vertical       │
│ direction along a vertical axis, a          │
│ flatbread stack from a conveyor that        │
│ transports the flatbread stack along a      │
│ longitudinal axis that is substantially     │
│ perpendicular to the vertical axis      202 │
└─────────────────────────────────────────────┘
                      │
                      ▼
┌─────────────────────────────────────────────┐
│ Extend a transport arm that includes a      │
│ second upper surface in a first direction   │
│ along the longitudinal axis             204 │
└─────────────────────────────────────────────┘
                      │
                      ▼
┌─────────────────────────────────────────────┐
│ Remove, with the second upper surface, the  │
│ flatbread stack from the lifting platform   │
│                                         206 │
└─────────────────────────────────────────────┘
                      │
                      ▼
┌─────────────────────────────────────────────┐
│ Place, with the transport arm, the          │
│ flatbread stack on an upper pedestal        │
│ surface of a cutting pedestal by retracting │
│ the transport arm in a second direction     │
│ along the longitudinal axis             208 │
└─────────────────────────────────────────────┘
                      │
                      ▼
┌─────────────────────────────────────────────┐
│ Cut, with a cutting press, one or more      │
│ flatbread pieces from the flatbread stack   │
│ while the upper pedestal surface of the     │
│ cutting pedestal supports the flatbread     │
│ stack                                   210 │
└─────────────────────────────────────────────┘
```

FIG. 2

FLATBREAD CUTTING SYSTEM

CROSS-REFERENCE TO RELATED APPLICATION

This application claims the benefit of U.S. Provisional Application No. 63/220,238, filed on Jul. 9, 2021, the contents of which are incorporated by reference herein.

BACKGROUND

Examples of comestible products are flatbreads, which include, for example, tortillas, pita bread, pizza crusts, chapati, and naan. Flatbreads can be made by hand or with automated equipment. For example, a factory can produce one or more types of flatbread. Factories can use partially or fully automated systems to produce flatbread. Automated methods to form flatbread can include, for example, die cutting, sheeting, and pressing of flatbread dough.

Factories can include different types of tools or equipment for the different stages in the production process, such as a mixer, a sheeter, or forming press, and an oven. Some production lines have tools to form flatbread dough into a ball and other tools to flatten the dough for baking. The flattened dough can have a circular shape and a specific thickness so the flatbread will have a desired thickness after baking.

SUMMARY

In general, one aspect of the subject matter described in this specification can be embodied in a system that includes a lifting platform configured to move in a first direction to remove a flatbread stack from a conveyor along an axis, which conveyor transports the flatbread stack along a longitudinal axis that is substantially perpendicular to the axis; a transport arm configured to a) move in a first direction along the longitudinal axis to remove the flatbread stack from the lifting platform, and b) move in a second direction along the longitudinal axis to place the flatbread stack on a cutting pedestal; and the cutting pedestal configured to receive the flatbread stack from the transport arm and to support the flatbread stack for a subsequent cutting operation.

In general, one aspect of the subject matter described in this specification can be embodied in methods that include the actions of moving, by a lifting platform and in a first vertical direction along an axis, a flatbread stack from a conveyor that transports the flatbread stack along a longitudinal axis that is substantially perpendicular to the axis; moving a transport arm in a first direction along the longitudinal axis; removing, with the transport arm, the flatbread stack from the lifting platform; placing, with the transport arm, the flatbread stack on a cutting pedestal by moving the transport arm in a second direction along the longitudinal axis; and cutting, with a cutting press, one or more flatbread pieces from the flatbread stack while the cutting pedestal supports the flatbread stack.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, the cutting pedestal can include a flatbread stop with a concave inner surface configured to substantially align a central axis of the flatbread stack with a central axis of the cutting pedestal. The system can include an aligner configured to move the flatbread stack toward the concave inner surface of the flatbread stop and substantially align the flatbread stack with the central axis of the cutting pedestal while the flatbread stack is received on the cutting pedestal.

In some implementations, the system can include a cutting press configured to press the flatbread stack and cut one or more flatbread pieces from the flatbread stack while the flatbread stack is received on the cutting pedestal. The system can include a product catch configured to catch the cut one or more flatbread pieces.

In some implementations, the system can include the conveyor configured to transport the flatbread stack along the longitudinal axis that is substantially perpendicular to the axis along which the lifting platform is configured to remove the flatbread stack from the conveyor. The first direction can be approximately 180 degrees opposite the second direction along the longitudinal axis.

In some implementations, the cutting pedestal can include a plurality of blades configured to cut one or more flatbread pieces from the flatbread stack. The lifting platform can include two or more supports each of which is configured to pass through a corresponding aperture in the conveyor. Each of the two or more supports can include a blade. The conveyor can include three or more belts. Each of the two or more supports can be adapted to move upward along a corresponding axis between a corresponding pair of the three or more belts. The transport arm can include two or more fingers each of which is configured to move in apertures between corresponding supports from the two or more supports in the lifting platform.

In some implementations, the lifting platform can be configured to move in a second direction opposite the first direction to place the flatbread stack on the transport arm. The first direction can include a first vertical direction. The transport arm can be configured to move in a second vertical direction to place the flatbread stack on the cutting pedestal after removing the flatbread stack from the lifting platform. The transport arm can be configured to move in the second vertical direction to place the flatbread stack on the cutting pedestal after at least partially moving in the second direction along the longitudinal axis. The system can include a flatbread stop: that can include a concave inner surface configured to substantially align a central axis of the flatbread stack with a central axis of the cutting pedestal. The flatbread stop can be configured to move substantially concurrently with the transport arm in the second vertical direction. The flatbread stop can be configured to move in a first direction while the cutting pedestal supports the flatbread stack and before a cutting press cuts one or more flatbread pieces from the flatbread stack.

In some implementations, the system can include a support frame coupled to the lifting platform, the transport arm, and the cutting pedestal. The cutting pedestal can be configured to receive, on a flatbread piece on an upper pedestal surface, the flatbread stack from the transport arm. The transport arm can be configured to move above the flatbread piece in the first direction along the longitudinal axis and remove the flatbread stack from the lifting platform.

In some implementations, the system can include a flatbread stop configured to substantially align the flatbread stack with a central axis of the cutting pedestal. The system can include an aligner configured to move the flatbread stack toward the flatbread stop and align the flatbread stack with the central axis of the cutting pedestal. The transport arm can be configured to partially retract in the second direction along the longitudinal axis to position the flatbread stack above the cutting pedestal. The transport arm can be configured to, e.g., after partially retracting, support the flatbread stack while the aligner moves the flatbread stack toward the flatbread stop and substantially aligns the flatbread stack with the central axis of the cutting pedestal. The transport arm can be configured to, e.g., after supporting the flatbread stack, finish retracting in the second direction along the longitudinal axis to i) place the flatbread stack on the cutting pedestal and ii) place the transport arm outside an area substantially above the cutting pedestal.

In some implementations, the method can include substantially aligning, using a flatbread stop with a concave inner surface configured to contact the flatbread stack, a central axis of the flatbread stack with a central axis of the cutting pedestal. The method can include moving, using an aligner, the flatbread stack toward the concave inner surface of the flatbread stop to substantially align the flatbread stack with the central axis of the cutting pedestal while the flatbread stack is received on the cutting pedestal. The method can include cutting, using a cutting press, one or more flatbread pieces from the flatbread stack while the flatbread stack is received on the cutting pedestal. The method can include catching, using a product catch, the cut one or more flatbread pieces.

In some implementations, the method can include transporting, using the conveyor, the flatbread stack along the longitudinal axis that is substantially perpendicular to the axis along which the lifting platform is configured to remove the flatbread stack from the conveyor. Cutting the one or more flatbread pieces can include cutting, using a plurality of blades included in the cutting press, the one or more flatbread pieces from the flatbread stack.

In some implementations, the method can include moving the flatbread stack can include moving, using the lifting platform that includes two or more supports, the flatbread stack from the conveyor by moving a corresponding support upward along a corresponding axis between a corresponding pair belts from three or more belts included in the conveyor. Moving the corresponding support upward can include moving the corresponding support upward can include moving the corresponding supports through the corresponding aperture formed by the pair of belts. Removing the flatbread stack from the lifting platform can include placing, by moving the lifting platform in a second direction opposite the first direction, the flatbread stack on the transport arm.

In some implementations, the first direction can include a first vertical direction. Placing the flatbread stack on the cutting pedestal can include placing, by moving the transport arm in a second vertical direction, the flatbread stack on the cutting pedestal after removing the flatbread stack from the lifting platform. The method can include substantially aligning, using a flatbread stop that includes a concave inner surface configured to contact the flatbread stack, a central axis of the flatbread stack with a central axis of the cutting pedestal; and placing the flatbread stack on the cutting pedestal can include moving the flatbread stop substantially concurrently with the transport arm in the second vertical direction. The method can include substantially aligning, using an aligner, the flatbread stack with the central axis of the cutting pedestal by moving the flatbread stack toward the flatbread stop. The method can include positioning the flatbread stack above the cutting pedestal by partially retracting the transport arm in the second direction along the longitudinal axis; after positioning the flatbread stack above the cutting pedestal, maintaining, with the transport arm in substantially the same position, the flatbread stack above the cutting pedestal while the aligner moves the flatbread stack toward the flatbread stop; and after maintaining the flatbread stack in substantially the same position, placing, using the flatbread stop and the transport arm, the flatbread stack on the cutting pedestal by finishing retracting the transport arm in the second direction along the longitudinal axis to place the transport arm outside an area substantially above the cutting pedestal.

The subject matter described in this specification can be implemented in various embodiments and may result in one or more of the following advantages. In some implementations, the flatbread cutting system described in this document can process flatbread more quickly, more accurately, more safely, more uniformly, or a combination of these, compared to other systems, e.g., that do not include a transport arm, a lifting platform, or both. For instance, the flatbread cutting system can use the transport arm, the lifting platform, or both, to automatically place a flatbread stack on a cutting pedestal, eliminating a need for an operator to place the flatbread stack on the cutting pedestal. This can reduce the risk of the operator being injured by the cutting press or other equipment in the flatbread cutting system. In some examples, the flatbread cutting system can process flatbread more accurately using the transport arm, the lifting platform, or both, by increasing a likelihood that a flatbread stack is centered on the cutting pedestal, under the cutting press, or both.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for cutting flatbread pieces from a flatbread stack.

DETAILED DESCRIPTION

Figure 1A:
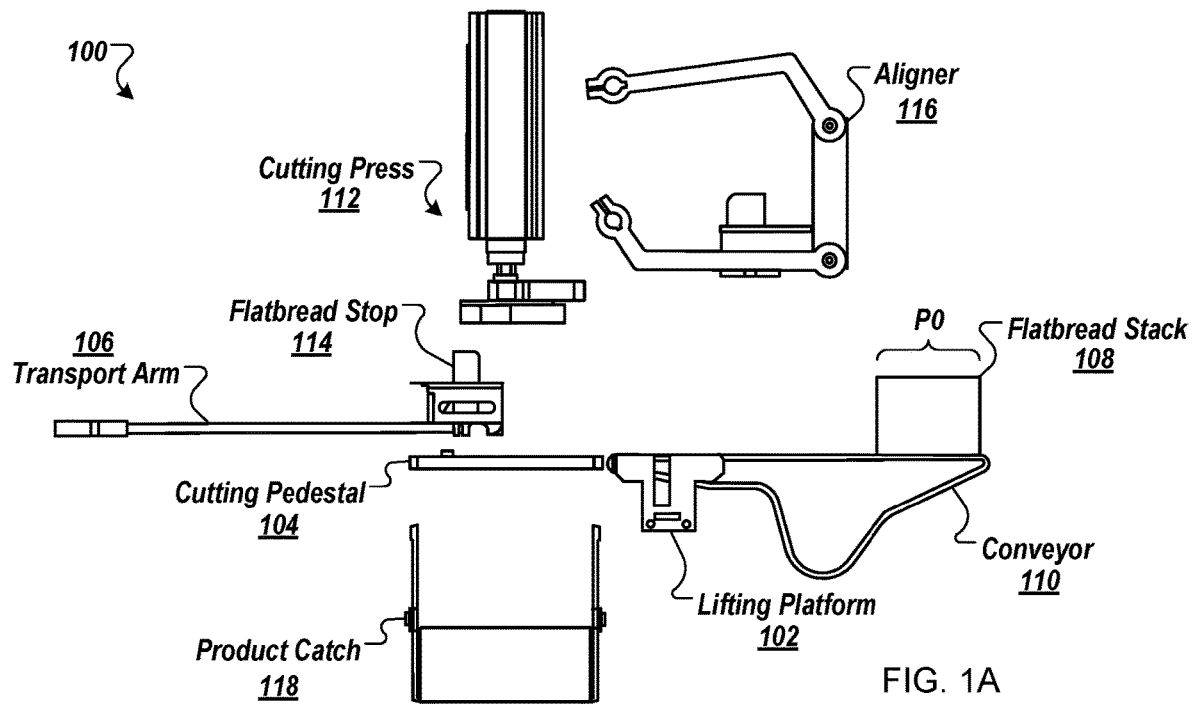
FIGS. 1A to 1L-2 depict a flatbread cutting system.

Some flatbread cutting systems can require an operator to place a flatbread stack onto a cutting pedestal. To reduce a likelihood of operator injury during the placement process, and increase flatbread processing speed and accuracy, a flatbread cutting system can use a transport arm, a lifting platform, or both. For example, the flatbread cutting system can use the lifting platform to raise the flatbread stack from a conveyor and a transport arm to move the flatbread stack from the lifting platform onto a cutting pedestal. The flatbread cutting system can then press the flatbread stack with a cutting press to cut one or more flatbreads in the flatbread stack. This can include cutting all the flatbreads in the flatbread stack or a subset of the flatbreads, e.g., leaving some of the flatbreads on the cutting pedestal so that the cutting press does not dull blades in the cutting pedestal.

In some implementations, the flatbread cutting system can include an aligner, a flatbread stop, or both. The flatbread cutting system can use the aligner and the flatbread stop to substantially center the flatbread stack on the top of the cutting pedestal, e.g., increasing a uniformity of cut pieces created by cutting the one or more flatbreads in the flatbread stack. The flatbread stop can be substantially fixed in a horizontal plane. The aligner can move along the horizontal plane to push the flatbread stack into a concave, inner surface of the flatbread stop, e.g., a curved, inner surface. This movement by the aligner can substantially align a center of the flatbread stack with a center axis of the cutting pedestal.

When the flatbread cutting system only includes the flatbread stop, movement of the transport arm toward the concave, inner surface of the flatbread stop can substantially align the center of the flatbread stack with the center axis of the cutting pedestal. For instance, since the transport arm moves toward the concave, inner surface while supporting the flatbread stack, an edge of the flatbread stack can contact the concave, inner surface of the flatbread stop. This contact can guide the flatbread stack to a position above the cutting pedestal that substantially aligns the center axes of the flatbread stack and the cutting pedestal.

FIGS. 1A to 1L-2 depict a flatbread cutting system 100. In some implementations, a tortilla chip cutting system is an example of the flatbread cutting system 100. The flatbread cutting system includes a lifting platform 102, a cutting pedestal 104, and a transport arm 106. The lifting platform 102, the cutting pedestal 104, and the transport arm 106 can be coupled to a support frame included in the flatbread cutting system 100. The flatbread cutting system 100 can use the lifting platform 102 to remove a flatbread stack 108 from a conveyor 110. The flatbread cutting system 100 can extend the transport arm 106, as described in more detail below, toward the lifting platform 102 to remove the flatbread stack 108 from the lifting platform. By retracting the transport arm 106, at least in part, the flatbread cutting system 100 can place the flatbread stack 108 onto the cutting pedestal 104.

The flatbread cutting system 100 can extend a cutting press 112 in a downward direction toward the flatbread stack 108. This can press flatbread pieces in the flatbread stack 108 against blades included in the cutting pedestal 104, cutting a piece of flatbread into flatbread subpieces. The flatbread subpieces can be used to make crackers, chips, or another form of cut flatbread, e.g., after baking the flatbread subpieces.

The flatbread cutting system 100 can include a product catch 118 that catches the flatbread subpieces. The product catch 118 can be a conveyor, a basket, or another appropriate device that catches the flatbread subpieces as they fall from the cutting pedestal 104. The product catch 118 can transport the flatbread subpieces to an oven that bakes the flatbread subpieces.

In some implementations, the flatbread cutting system 100 can include a flatbread stop 114, an aligner 116, or both. The flatbread cutting system 100 can use the flatbread stop 114, the aligner 116, or both, to align the flatbread stack 108 on the cutting pedestal 104, e.g., for more uniform flatbread subpiece sizes.

In some implementations, the flatbread cutting system 100 can be a subsystem of a larger system. For instance, the larger system can make flatbread, such as tortillas, and then cut the flatbread to make the flatbread subpieces. The larger system can include one or more subsystems that form and bake the flatbread, e.g., making tortillas, the flatbread cutting subsystem that cuts the flatbread to make the flatbread subpieces, and a final baking flatbread subsystem that bakes or fries, the flatbread subpieces, e.g., making tortilla chips.

As shown in FIG. 1A, the flatbread cutting system 100 can receive a flatbread stack 108 at position P0 onto the conveyor 110. The conveyor 110 can move in a longitudinal direction along a longitudinal axis. The movement of the conveyor 110 can cause the flatbread stack 108 to move to an indexed position P1, shown in FIG. 1B.

The flatbread cutting system 100 can include a motor that drives the conveyor 110. The motor is coupled to the conveyor 110 and moves the upper portion of the conveyor 110 in a first direction along the longitudinal axis. The first direction is toward the cutting pedestal 104. The motor can be any appropriate type of motor.

Figure 1B:
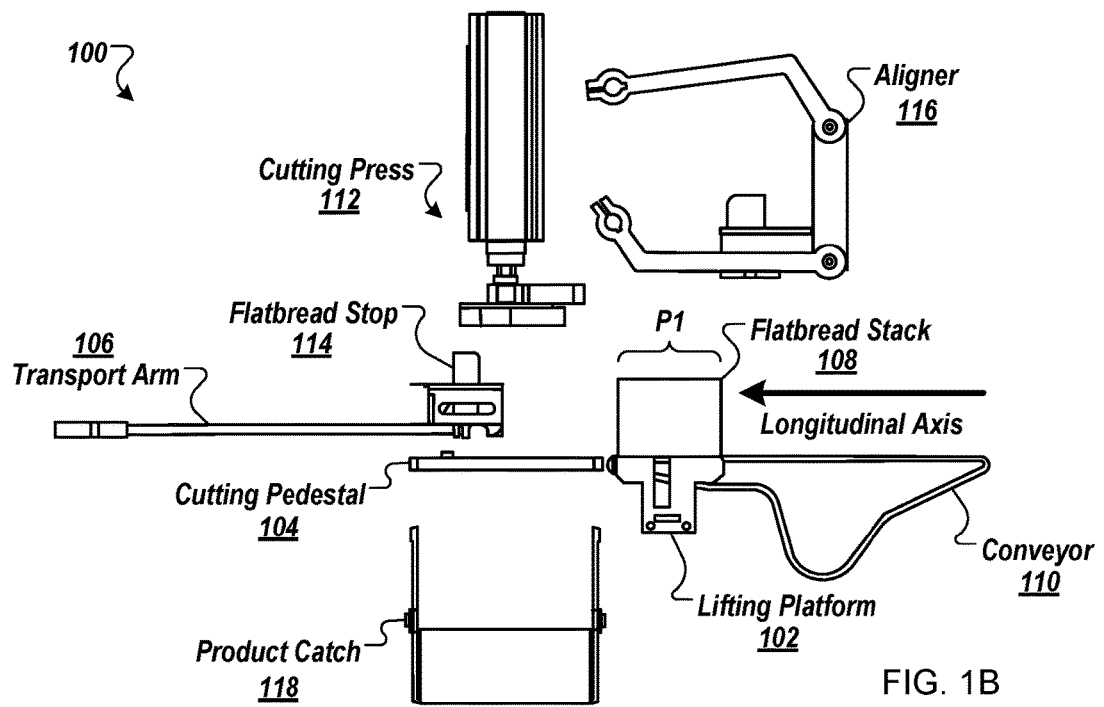

As shown in FIGS. 1A-B, when the flatbread cutting system 100 receives the flatbread stack 108, an upper surface of the lifting platform 102 is below an upper surface of the conveyor 110. This enables the flatbread cutting system 100 to position the flatbread stack 108 above the lifting platform 102, at the indexed position P1. The indexed position P1 can be substantially centered above the lifting platform 102.

Figure 1C:
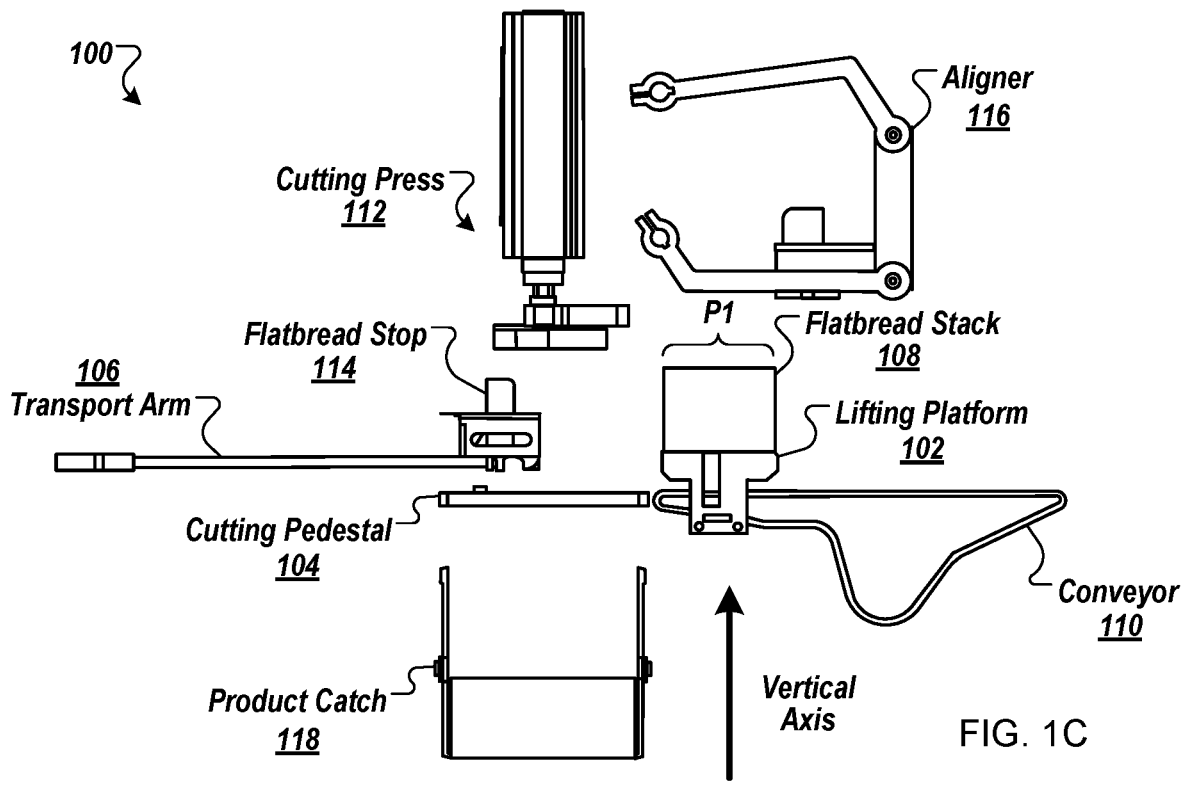

As shown in FIG. 1C, the flatbread cutting system 100 can raise the lifting platform 102 to raise the flatbread stack 108 off of the conveyor 110 while the flatbread stack 108 is substantially at the indexed position P1. This can include moving the upper surface of the lifting platform 102 above the upper surface of the conveyor 110. A bottom surface of a flatbread piece in the flatbread stack 108, e.g., the bottom most flatbread piece, can contact an upper surface of the lifting platform 102 when the lifting platform 102 raises the flatbread stack.

When the flatbread cutting system 100 includes the motor, the motor can continue to move the conveyor 110 while the lifting platform 102 lifts the flatbread stack 108 off the conveyor 110. For instance, the flatbread cutting system 100 can time the movement of the lifting platform 102 with the movement of the conveyor 110 such that the lifting platform 102 raises the flatbread stack 108 off of the conveyor 110 when the flatbread stack 108 is substantially centered on the lifting platform 102 while the conveyor 110 continues to move, e.g., and does not stop. This can increase the throughput of the flatbread cutting system 100, reduce wear and tear caused by stopping and starting the motor that moves the conveyor 110, or both.

The flatbread cutting system 100 can raise the lifting platform 102 to a predetermined height above the conveyor 110. The height can be selected to enable the transport arm 106 to remove the flatbread stack 108 from the lifting platform 102, to prevent the conveyor 110 from moving the flatbread stack 108, or both.

While the flatbread cutting system 100 raises the lifting platform 102, the flatbread cutting system 100 can position the transport arm 106 in an upper position. For instance, the flatbread cutting system 100 can move, maintain, or both, the transport arm 106 to the upper position, maintain the transport arm 106 in the upper position, e.g., when the transport arm 106 is in the upper position before the flatbread cutting system 100 has finished raising the lifting platform 102, or both. One example of the flatbread cutting system 100 moving the transport arm 106 is described in more detail below with reference to FIG. 1L. As shown in FIG. 1C, the flatbread cutting system 100 can maintain the transport arm 106 in the upper position.

The flatbread cutting system 100 can include one or more second motors coupled to the transport arm 106. For instance, a first motor can move the transport arm 106 laterally along the longitudinal axis. A second motor can move the transport arm 106, e.g., vertically along the vertical axis. In some examples, a single motor can move the transport arm 106 laterally, vertically, or both.

In some examples, the flatbread cutting system 100 moves, maintains, or both, the cutting press 112 in an upper position. For example, the flatbread cutting system 100 can move, maintain, or both, the cutting press 112 to the upper position, maintain the cutting press 112 in the upper position, e.g., when the cutting press 112 is in the upper position before the flatbread cutting system 100 has finished raising the lifting platform 102, or both. As shown in FIG. 1C, the flatbread cutting system 100 can maintain the cutting press 112 in the upper position. As described in more detail below with reference to FIG. 1K, the flatbread cutting system 100 can move the cutting press 112 to the upper position.

A position of the raised cutting press 112 can be selected to provide sufficient clearance for the transport arm 106 to move the flatbread stack 108 from position P1 to a position P2, described in more detail below with reference to FIG. 1F. The position P2 can be substantially centered on the cutting pedestal 104, under the cutting press 112, or both. For instance, the position of the raised cutting press 112 can be at least a threshold amount above a likely top surface position of the flatbread stack 108 if the flatbread stack 108 were positioned under the cutting press 112 by the transport arm 106.

The flatbread cutting system 100 can include a motor to move the cutting press 112 along a vertical axis. The motor can be a piston or another appropriate type of motor. The piston can move the cutting press 112 downward, causing the cutting press 112 to apply a force onto an upper surface of the flatbread stack 108, e.g., when cutting at least some flatbread pieces in the flatbread stack 108. The piston can move the cutting press upward to enable the transport arm 106 to position the flatbread stack 108 under the cutting press 112, above the cutting pedestal 104, or both.

Figure 1D:
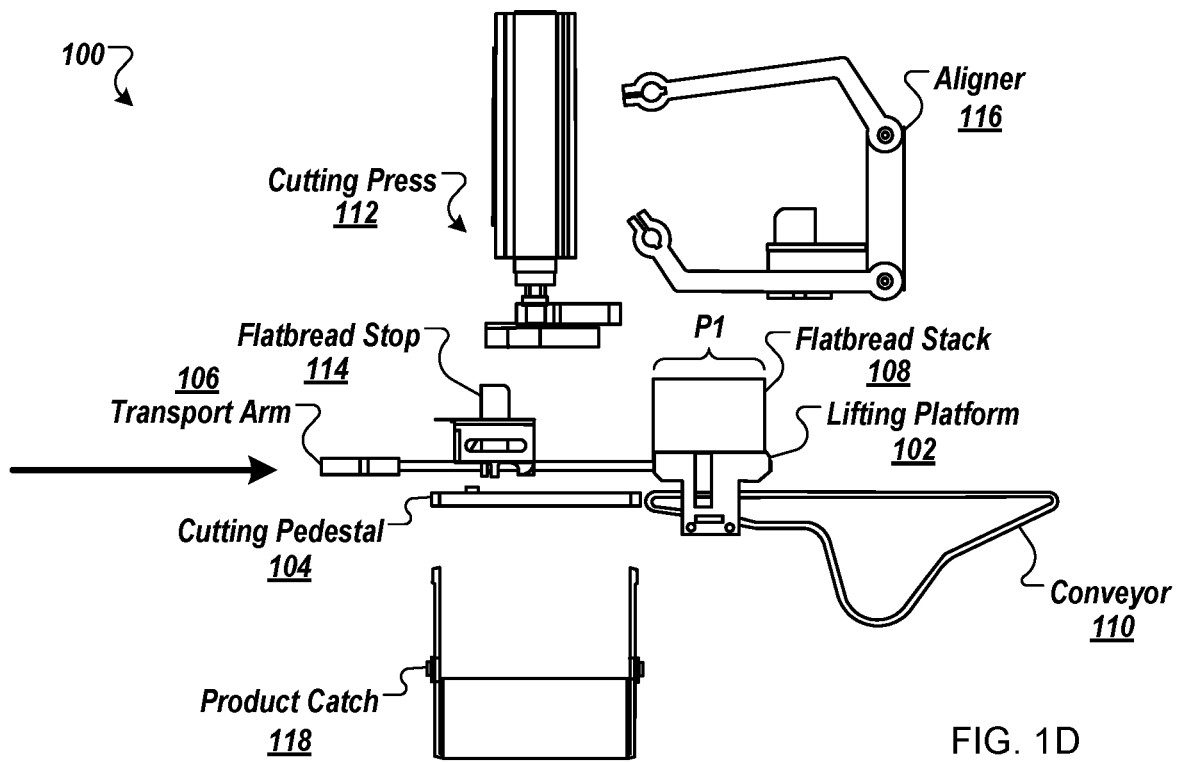

FIG. 1D depicts the transport arm 106 in an extended position. The flatbread cutting system 100 can extend the transport arm 106 toward the conveyor 110 and the lifting platform 102. The lifting platform 102 can include multiple apertures that enable the transport arm 106 to extend into the lifting platform 102 and remove the flatbread stack 108 from the lifting platform 102. During this stage, an upper surface of the lifting platform 102 is located above an upper surface of the transport arm 106.

The lifting platform 102 can include multiple components. For example, the lifting platform 102 can include multiple supports, e.g., blades, with apertures between the supports configured to receive corresponding components, e.g., fingers, from the transport arm 106. The number of supports used for the lifting platform 102 can be configured based on the number of fingers required for the transport arm 106 to securely remove the flatbread stack 108 from the lifting platform 102.

The components of the lifting platform 102, and the components of the transport arm 106 can be manufactured from any appropriate material or materials. For instance, the components of the lifting platform 102 can be manufactured from plastic. The components of the transport arm 106 can be manufactured from metal.

The conveyor 110 can include multiple components between which the multiple components of the lifting platform 102 pass. For example, the multiple components of the conveyor 110 can define multiple apertures in the conveyor 110, and the components of the lifting platform 102 can each pass through a corresponding aperture in the conveyor 110 when raising the flatbread stack 108 off of the top surface of the conveyor 110. In some examples, the multiple components of the conveyor 110 can include multiple belts. The belts can be manufactured from plastic, metal, or a combination of both.

Figure 1E:
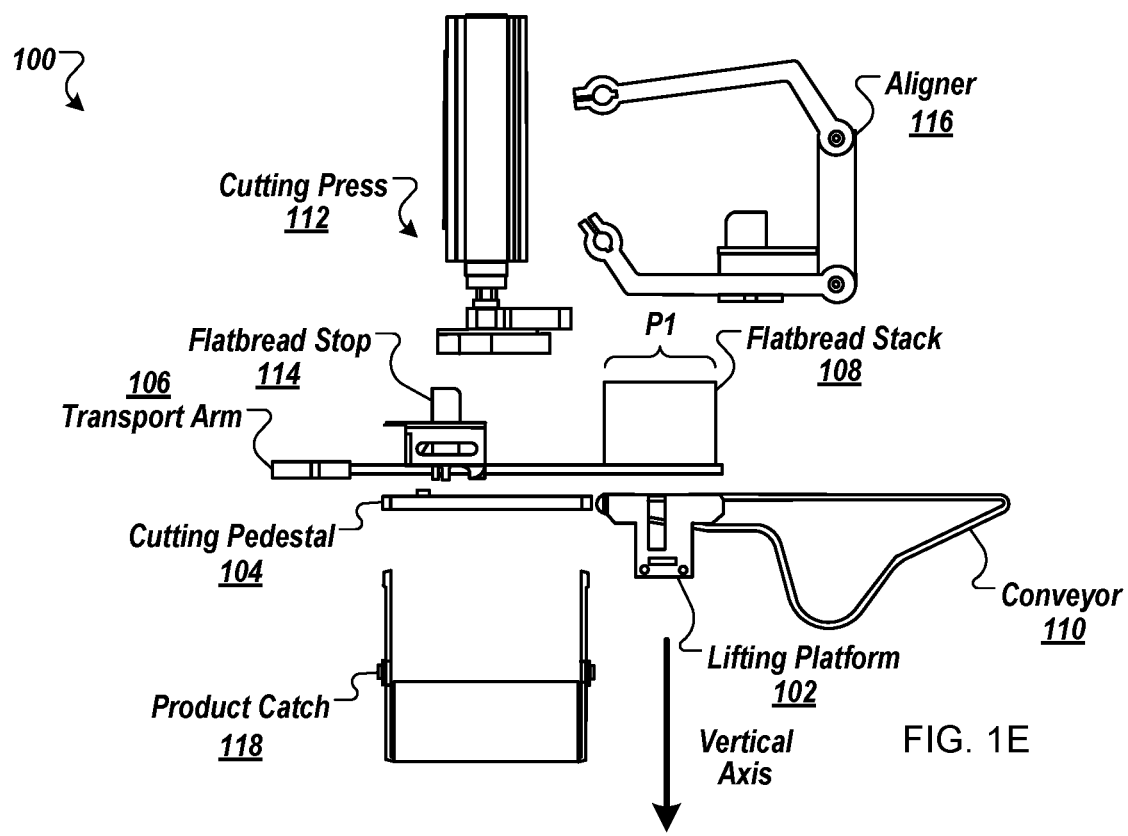

FIG. 1E depicts the lifting platform 102 in a lowered position. To remove the flatbread stack 108 from the upper surface of the lifting platform 102, the flatbread cutting system 100 can lower the lifting platform 102, e.g., using the motor coupled to the lifting platform 102. Because an upper surface of the lifting platform 102 was positioned above an upper surface of the transport arm 106, the flatbread stack 108 remained on the lifting platform 102 before FIG. 1E. When the upper surface of the lifting platform 102 moves below the upper surface of the transport arm 106, while the lifting platform 102 is lowered, the flatbread cutting system 100 places the flatbread stack 108 onto the upper surface of the transport arm 106. This process can occur while the transport arm 106 remains in the extended position.

The flatbread cutting system 100 can lower the lifting platform 102 to any appropriate height. For instance, the flatbread cutting system 100 can lower the lifting platform 102 so that the upper surface of the lifting platform 102 is below an upper surface of the conveyor, e.g., as described with reference to FIGS. 1A-B. This enables the conveyor 110 to place another flatbread stack above the lifting platform 102 as part of a process to cut the other flatbread stack.

In some implementations, if the cutting press 112 is not already in a fully raised position, the flatbread cutting system 100 can move the cutting press 112 to the fully raised position when placing the flatbread stack 108 onto the transport arm 106. For instance, the flatbread cutting system 100 can perform some of the operations described with reference to FIGS. 1A to 1L-2 for a first flatbread stack while performing other operations for a second flatbread stack.

For example, when the flatbread cutting system 100 does not include the aligner 116, the flatbread cutting system 100 can cut the first flatbread stack 108 with the cutting press 112 while positioning a second flatbread stack on the conveyor 110. While cutting the first flatbread stack 108, the flatbread cutting system 100 can position the transport arm 106 in a retracted, raised position and the cutting press 112 in a lowered position. Once the flatbread cutting system 100 finishes cutting the first flatbread stack 108, the flatbread cutting system 100 can begin to extend the transport arm 106 while raising the cutting press 112, e.g., performing some of the operations described with reference to FIGS. 1K-L. Substantially concurrently, the flatbread cutting system 100 can position the second flatbread stack on the lifting platform 102 while the lifting platform 102 is in the raised position. The flatbread cutting system 100 can then position the second flatbread stack onto the transport arm 106 while lowering the lifting platform 102. If the cutting press 112 was not already fully raised, the flatbread cutting system 100 can continue to raise the cutting press 112 while positioning the second flatbread stack onto the transport arm 106.

Figure 1F:
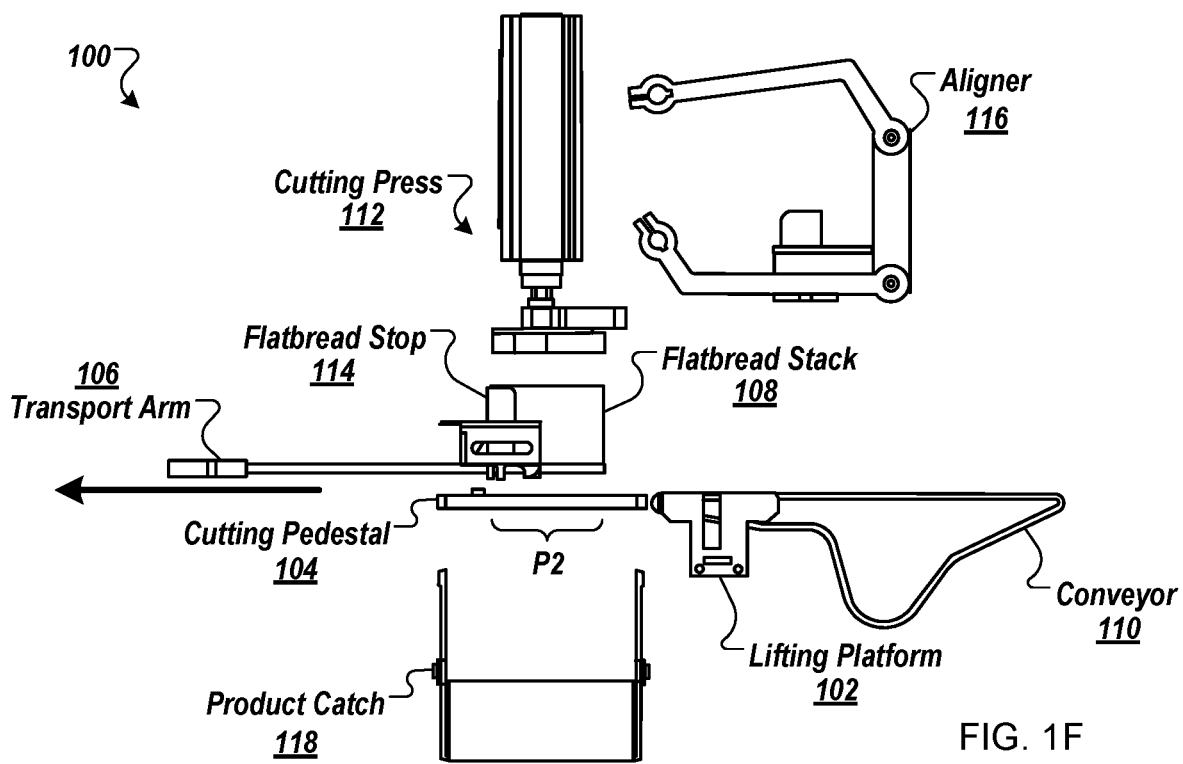

FIG. 1F depicts the transport arm 106 in a partially retracted position. The flatbread cutting system 100 can move the transport arm 106 to the partially retracted position to lace the flatbread stack 108 on the cutting pedestal 104. For instance, the flatbread cutting system 100 can moves the transport arm 106 to position the flatbread stack 108 at a position P2. For instance, the flatbread cutting system 100 can partially retract the transport arm 106 from the extended position so that the flatbread stack 108 contacts the flatbread stop 114, which movement places the flatbread stack at position P2.

The position P2 can be any appropriate position. For instance, the position P2 can be substantially centered on the cutting pedestal 104, under the cutting press 112, or both. In some examples, the position P2 can be a position with respect to the cutting pedestal 104, the cutting press 112, or both, that is not centered on one or both of the cutting pedestal 104 or the cutting press 112. For instance, the transport arm 106 can move the flatbread stack 108 to the position P2 that is off center from a center axis of the cutting pedestal 104. In these instances, the flatbread cutting system 100 can use the aligner 116 to substantially center the flatbread stack 108 on the center axis of the cutting pedestal 104.

In some examples, the flatbread cutting system 100 can partially retract the transport arm 106 to the partially retracted position that is a predetermined position in which the flatbread stack 108 is at least a distance from the flatbread stop 114. In these examples, the flatbread stack 108 can be at least a predetermined distance from the flatbread stop 114, does not yet contact the flatbread stop 114, or both.

The flatbread cutting system 100 can partially retract the transport part to the predetermined position when the flatbread cutting system 100 includes the aligner 116. In these implementations, as described in more detail below, the flatbread cutting system 100 can use the aligner 116 to move the flatbread stack 108 to contact the flatbread stop 114, to substantially align a first vertical center axis of the flatbread stack 108 with a second vertical center axis of the cutting pedestal 104, or both.

Figures 1, 1G:
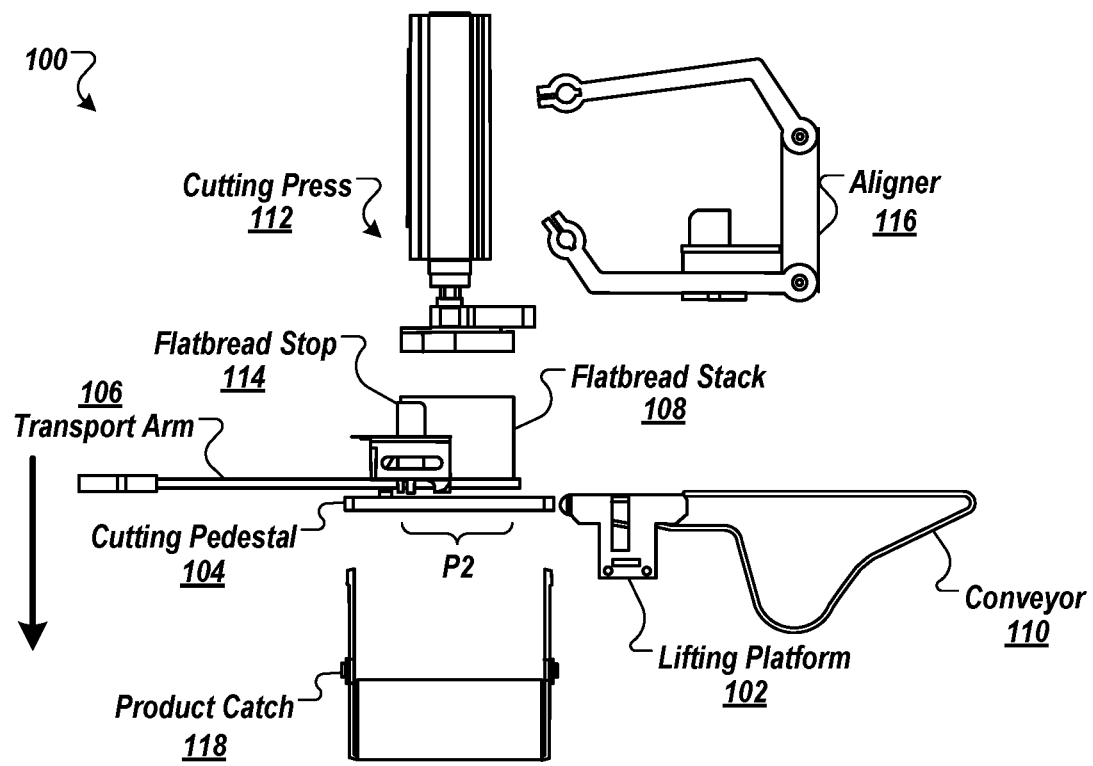
Figures 1, 1G, 2:
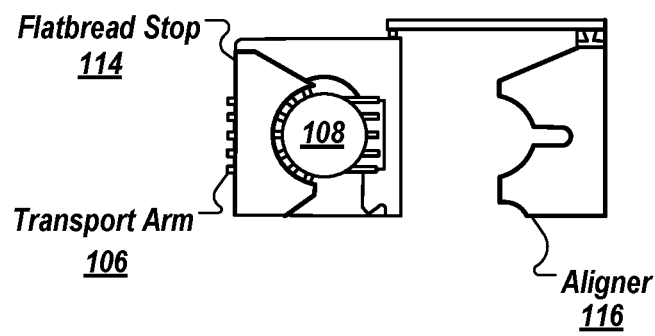

FIGS. 1G-1 to 1G-2 depict the transport arm 106 and the flatbread stop 114 in a lowered position. FIG. 1G-1 depicts an end view of the transport arm 106 and the flatbread stop 114 in the lowered position. FIG. 1G-2 depicts a plan view of the transport arm 106 and the flatbread stop 114 in the lowered position, e.g., at the same instant as that shown in FIG. 1G-1.

For instance, the flatbread cutting system 100 can lower one or both of the transport arm 106 or the flatbread stop 114. For example, while retracting the transport arm 106, the flatbread cutting system 100 can substantially concurrently lower the transport arm 106, the flatbread stop 114, or both. The flatbread cutting system 100 can lower the transport arm 106 to position a lower surface of the transport arm 106 substantially adjacent to an upper surface of the cutting pedestal 104. The lower surface of the transport arm 106 can be substantially adjacent to the upper surface of the cutting pedestal 104 when one or more flatbread pieces, e.g., from a previously processed flatbread stack, are between the transport arm 106 and the cutting pedestal 104. This can occur when the flatbread cutting system 100 does not cut all flatbread pieces in a flatbread stack at the same time to reduce a likelihood of dulling blades included in the cutting pedestal 104, or the cutting press 112. The process of retracting, lowering, or both, the transport arm 106 can move the flatbread stack 108 from the transport arm 106 onto the cutting pedestal 104.

In some implementations, the flatbread cutting system 100 can position the aligner 116 in a lowered position. The flatbread cutting system 100 can position the aligner 116 in the lowered position while at least partially retracting the transport arm 106, lowering the transport arm 106, or both.

Figures 1, 1H:
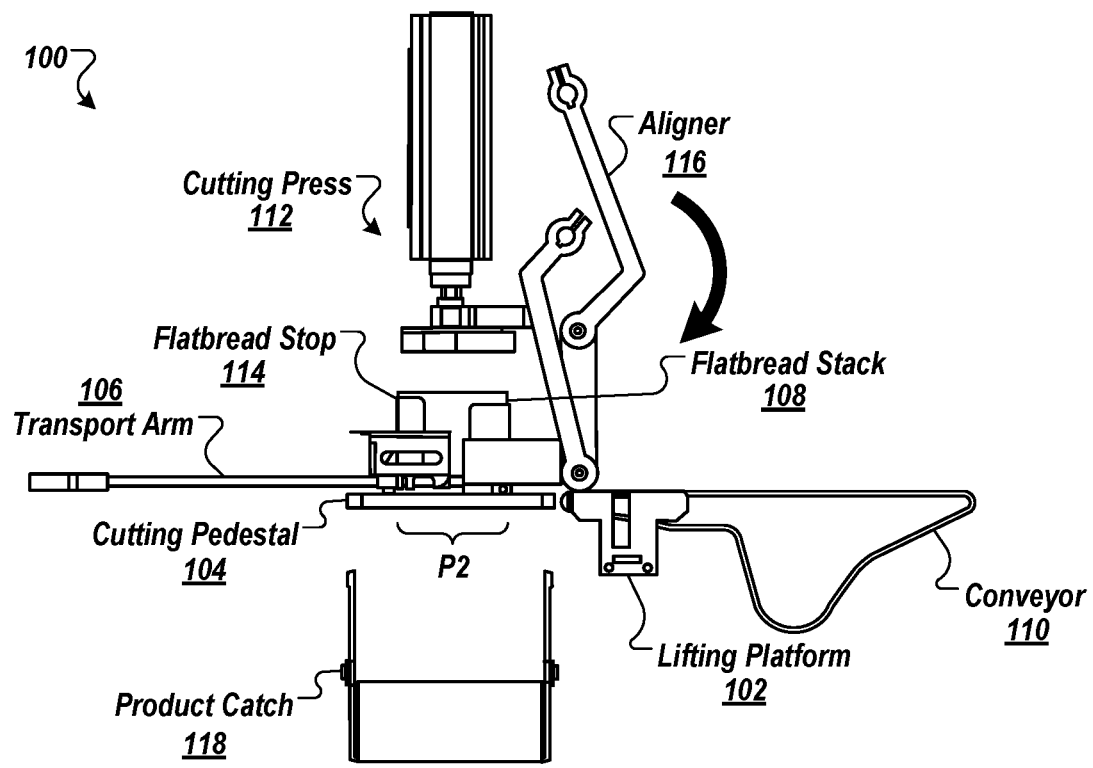
Figures 1, 1H, 2:
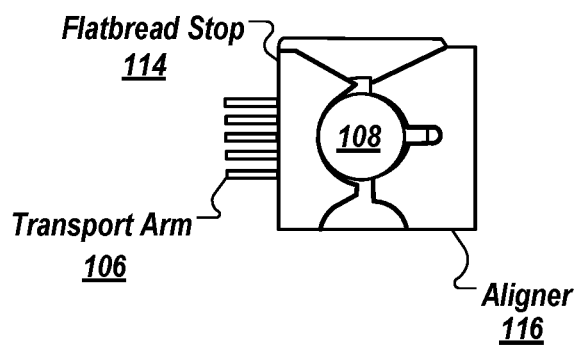

FIGS. 1H-1 and 1H-2 depict the aligner 116 in the lowered position. FIG. 1H-1 depicts an end view of the aligner 116 in the lowered position. FIG. 1G-2 depicts a plan view of the aligner 116 in the lowered position, e.g., at the same instant as that shown in FIG. 1G-1.

When the flatbread cutting system 100 positions the flatbread stack 108 substantially at the position P2 above the cutting pedestal 104, the flatbread cutting system 100 can begin to lower the aligner 116. The flatbread cutting system 100 can include a motor that lowers the aligner 116 to the lowered position.

The flatbread cutting system 100 can lower the aligner 116 to cause a concave, inner surface of the aligner 116 to contact a surface of the flatbread stack 108 opposite the flatbread stop 114. For example, a first surface of the flatbread stack 108 can be closest to a concave, inner surface of the flatbread stop 114, as shown in FIGS. 1G-2 and 1H-2, while the aligner 116 can be closest to a second, opposite surface of the flatbread stack 108. The concave, inner surfaces can be a curved, inner surface or a surface that has another polygonal surface.

When the transport arm 106 positions the flatbread stack 108 above the cutting pedestal 104, the transport arm 106 can extend past the second, opposite surface of the flatbread stack 108, as shown in FIG. 1G-2. As the aligner 116 comes into contact with the flatbread stack 108, the transport arm 106 continues to retract so that an end of the transport arm 106 does not contact the aligner 116, as shown in FIG. 1H-2. For instance, a first motor in the flatbread cutting system 100 continues to retract the transport arm 106 while a second motor included in the flatbread cutting system 100 lowers the aligner 116. Because the flatbread stop 114 is positioned opposite the aligner 116, the flatbread stack 108 remains above the cutting pedestal 104.

In the examples shown in FIGS. 1G-J, the transport arm 106 includes multiple fingers. The transport arm 106 extends these fingers between corresponding supports in the lifting platform 102 when the flatbread cutting system 100 moves the flatbread stack 108 from the lifting platform 102 onto the transport arm 106.

The flatbread stop 114 can include one or more apertures through which the fingers of the transport arm 106 move. For instance, when the transport arm 106 has six fingers, the flatbread stop 114 can include six apertures each of which are configured to allow a corresponding finger to move through as the transport arm 106 moves a flatbread stack 108 from the conveyor 110 onto the cutting pedestal 104.

The flatbread cutting system 100 includes multiple blades. The multiple blades can be included in the cutting pedestal 104 or the cutting press 112. For example, the cutting pedestal 104 can have at least a threshold quantity of blades sufficient to support the flatbread stack 108. When the cutting press 112 presses downward on the flatbread stack 108, the blades in the cutting pedestal 104 cut one or more flatbread pieces in the flatbread stack, e.g., to form unbaked chips or crackers.

The blades in the cutting pedestal 104 or the cutting press 112 are positioned to form cut flatbread products. For instance, when the cutting pedestal 104 is part of the flatbread cutting system 100, the cutting pedestal 104 can include two, three, or four blades that connect at the center, the outer edges of which form a quadrilateral, e.g., when there are two blades, a hexagon, e.g., when there are three blades, or an octagon, e.g., when there are four blades.

Figures 1, 1I:
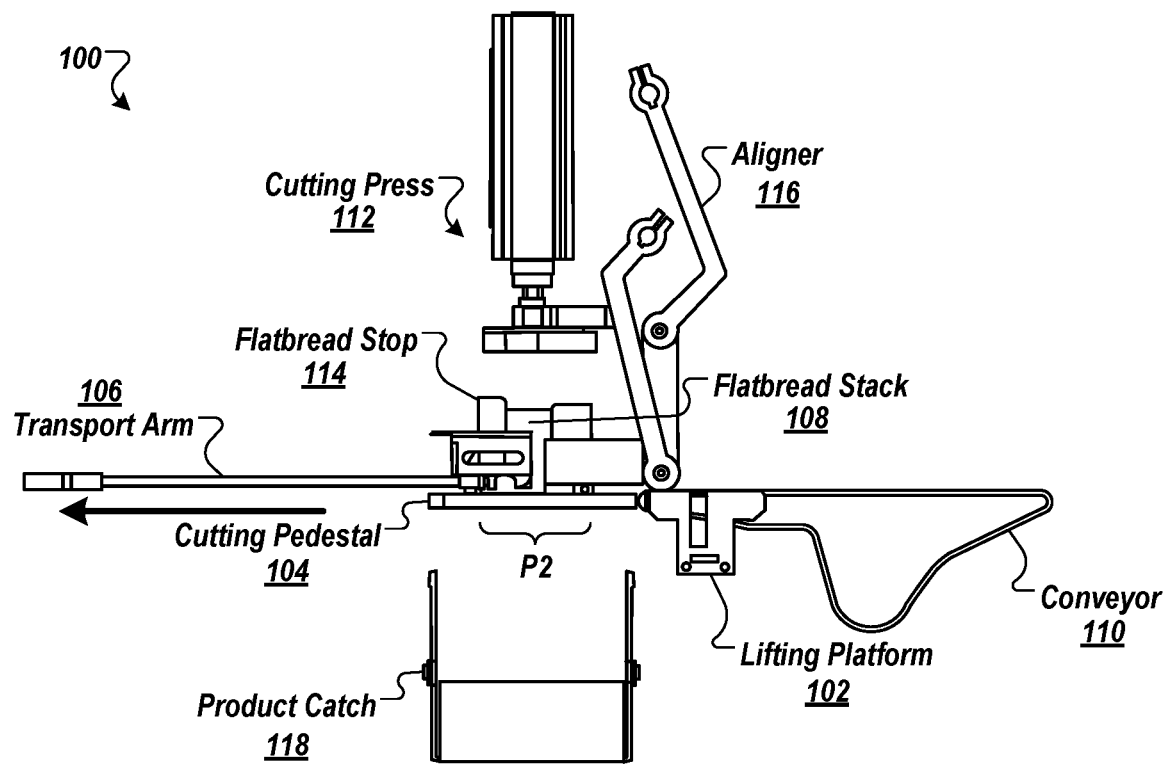
Figures 1, 1I, 2:
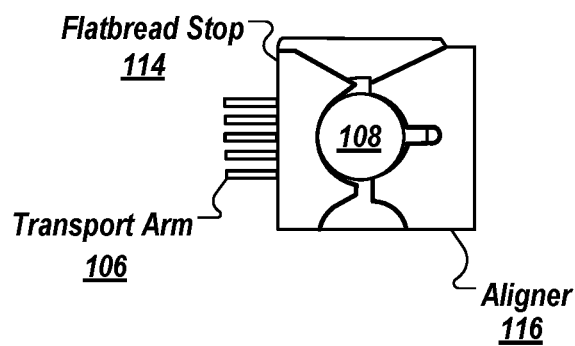

FIGS. 1I-1 and 1I-2 depict the transport arm 106 in a retracted position. For instance, FIGS. 1I-1 and 1I-2 depict the transport arm 106 in a fully retracted position. The retracted position can be a position in which the flatbread cutting system 100 retracts the transport arm 106 until the transport arm 106 is no longer below the cutting press 112, no longer above the cutting pedestal 104, or both. This can include retracting the transport arm 106 beyond an edge of the cutting pedestal 104, e.g., the edge of the cutting pedestal opposite the conveyor 110 and the lifting platform 102.

When the flatbread cutting system 100 retracts the transport arm 106, the transport arm 106 places the flatbread stack 108 on the cutting pedestal 104. For instance, the transport arm 106 can place the flatbread stack 108 on an upper surface of the cutting pedestal 104. This can occur because the transport arm 106 moves along a longitudinal axis away from the lifting platform 102 and the conveyor 110. As the transport arm 106 moves along the longitudinal axis, the flatbread stack 108 contacts the flatbread stop 114, e.g., the inner, concave surface of the flatbread stop 114, and slides along the upper surface of the transport arm 106. This movement of the flatbread stack 108 along the upper surface of the transport arm 106 causes the transport arm 106 to place the flatbread stack 108 on the upper surface of the cutting pedestal 104.

In some examples, when placing the flatbread stack 108 on the upper surface of the cutting pedestal 104, the transport arm 106 places the flatbread stack 108 on one or more other flatbread pieces that were already on the upper surface of the cutting pedestal 104. For example, when the flatbread cutting system 100 does not always cut every piece of flatbread in a flatbread stack, the upper surface of the cutting pedestal 104 can support one or more flatbread pieces from a prior stack, e.g., from a top of a prior stack. In these examples, the transport arm 106 places the flatbread stack 108 on the one or more flatbread pieces from the prior stack, which flatbread pieces are on the upper surface of the cutting pedestal 104.

In some implementations, a flatbread stack might not substantially align with the center of the cutting pedestal 104. For instance, a center of the flatbread stack 108 might be 0.5 to 6 inches away from a center of the cutting pedestal 104, e.g., along a longitudinal axis, a latitudinal axis, or a combination of both, that aligns with movement of the flatbread stack 108 along the conveyor 110. This can occur when a flatbread stack 108 was not accurately centered on the conveyor 110, moved latitudinally as the conveyor moved longitudinally, or for another reason.

To account for this, the flatbread cutting system 100 can retract the transport arm 106 in a direction along a longitudinal path away from the conveyor 110. As the transport arm 106 moves longitudinally, the flatbread stack 108 positioned on the upper surface of the transport arm 106 contacts a concave, inner surface of the flatbread stop 114. Because the flatbread stop 114 has a concave, inner surface, the flatbread stack 108 will move toward the center of the flatbread stop 114 to a position substantially aligned with the center of the cutting pedestal 104. For instance, this movement will cause the center of the flatbread stack 108 to become substantially centered with the center of the cutting pedestal 104 along the longitudinal axis.

This adjustment of the flatbread stack 108 position can increase a uniformity of cut comestible products formed by the flatbread cutting system 100. For instance, the use of the transport arm 106 and the flatbread stop 114 can increase a uniformity of flatbread subpieces created by the flatbread cutting system 100. This can occur because the transport arm 106 positions the flatbread stack 108 substantially centered on the inside of the flatbread stop 114, which substantially aligns the flatbread stack 108 with the cutting press 112, the cutting pedestal 104, or both.

The flatbread cutting system 100 lowers the cutting press 112 toward a lowered position. In some examples, the flatbread cutting system 100 can begin lowering the cutting press 112 while retracting the transport arm 106, lowering the aligner 116, or both.

Figures 1, 1J:
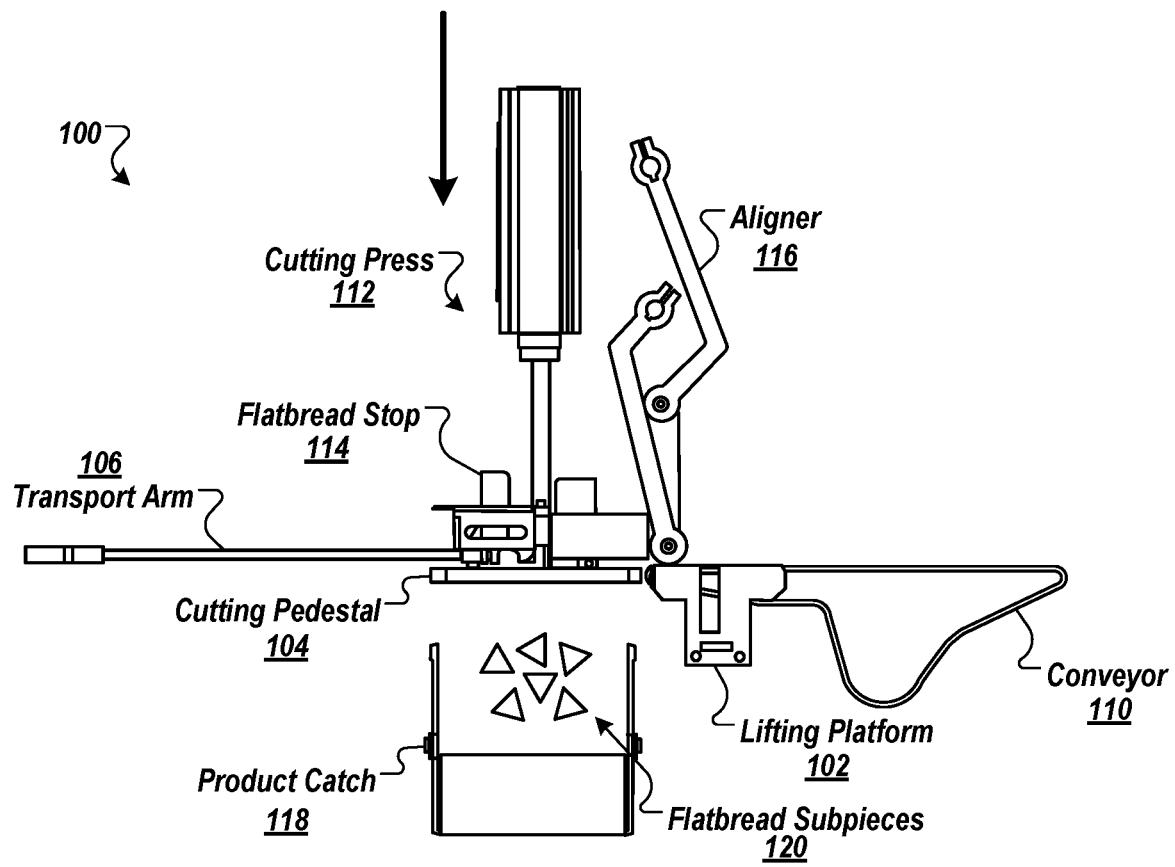
Figures 1, 1J, 2:
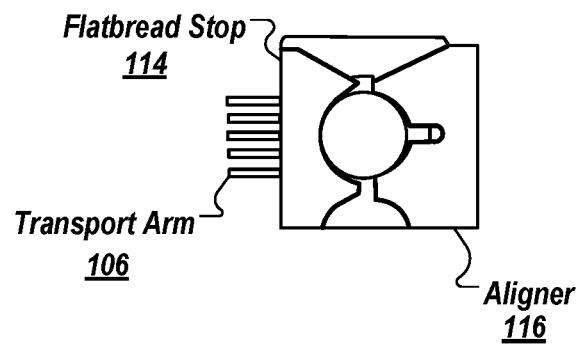

FIGS. 1J-1 and 1J-2 depict the cutting press 112 of a flatbread cutting system 100 in a lowered position. FIG. 1J-1 depicts an end view of the cutting pressing 112 in the lowered position. FIG. 1J-2 depicts a plan view of the cutting press 112 in the lowered position, e.g., at the same instant as that shown in FIG. 1J-1.

For example, the flatbread cutting system 100 can fully lower the cutting press 112 into the lowered position which movement causes the blades in the cutting pedestal 104, or in the cutting press 112, to cut flatbread pieces, e.g., tortillas, in the flatbread stack 108. In some examples, when the cutting press 112 is fully lowered into the lowered position, the blades in the cutting pedestal 104 cut some but not all of the flatbread pieces in a flatbread stack 108. In some instances, when the cutting press 112 is fully lowered into the lowered position, the blades in the cutting pedestal 104 cut all of the flatbread pieces in a flatbread stack 108.

At least some of the cut flatbread pieces, e.g., flatbread subpieces, can fall into the product catch 118. The product catch 118 can be any appropriate device adapted to catch the cut flatbread pieces that are cut by the cutting pedestal 104 and the cutting press 112. For example, the product catch 118 can be a conveyor, a basket, or another appropriate device. The product catch 118 can transport the flatbread subpieces to an oven that bakes the flatbread subpieces, e.g., to create chips or crackers.

Figures 1, 1K:
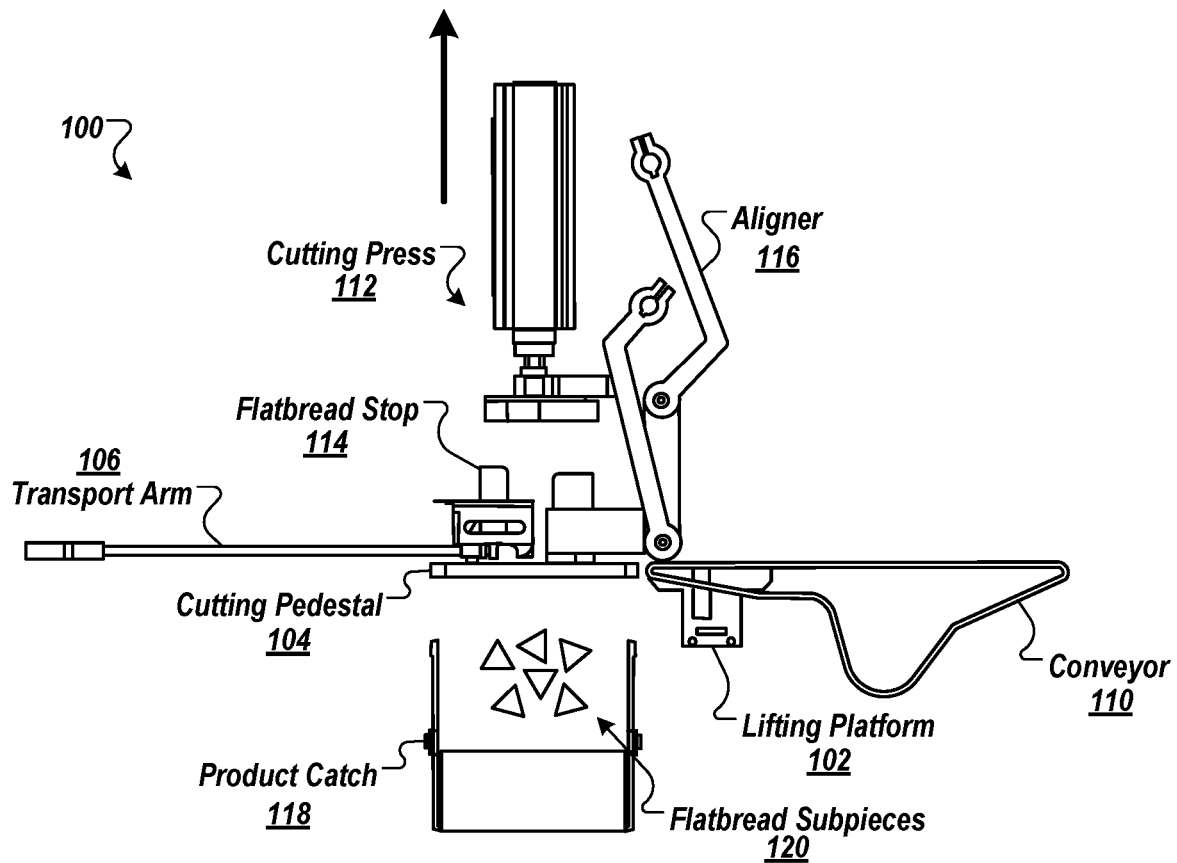
Figures 1, 1K, 2:
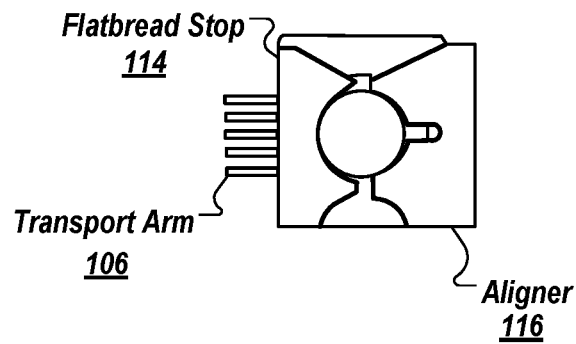
Figures 1, 1L:
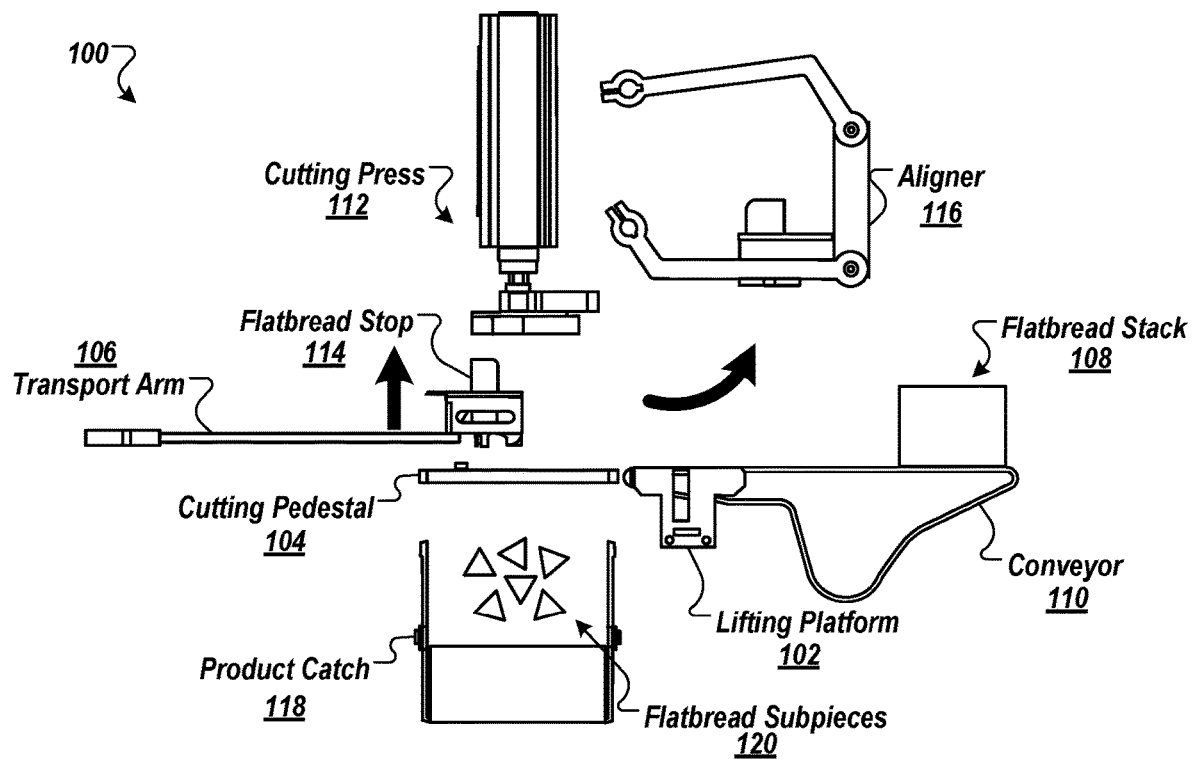
Figures 1, 1L, 2:
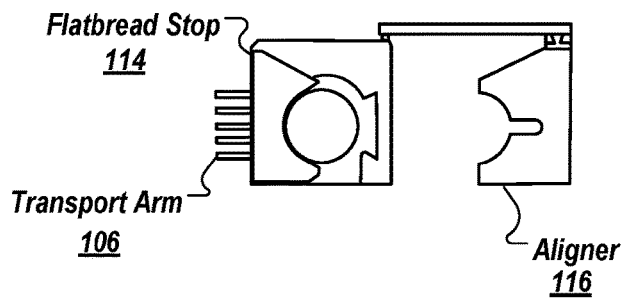

FIGS. 1K-L depict the flatbread cutting system 100 raising the cutting press 112, raising the transport arm 106, raising the flatbread stop 114, and raising the aligner 116. In some implementations, the flatbread cutting system 100 can raise two or more of these components. In some implementations, the flatbread cutting system 100 might raise only one of these components, e.g., depending on the stage in processing of the flatbread cutting system 100.

For instance, as shown in FIGS. 1K-1 and 1K-2, the flatbread cutting system can raise the cutting press 112. FIG. 1K-1 depicts an end view of the flatbread cutting system 100 raising the cutting press 112. FIG. 1K-2 depicts a plan view of the flatbread cutting system 100 raising the cutting press 112, e.g., at the same instant as that shown in FIG. 1K-1.

The flatbread cutting system 100 can use any appropriate component to raise, lower, or both, the cutting press 112. For instance, the flatbread cutting system 100 can use a motor, e.g., a piston, to raise, lower, or both, the cutting press 112 between the raised position and the lowered position.

FIGS. 1L-1 and 1L-2 depict the flatbread cutting system 100 raising the transport arm 106, raising the flatbread stop 114, and raising the aligner 116. The flatbread cutting system 100 can raise the transport arm 106, the flatbread stop 114, the aligner 116, the cutting press 112, or a combination of two or more of these. When raising a combination of two or more of these, the flatbread cutting system 100 can raise the various components substantially concurrently. For example, the flatbread cutting system 100 can begin to raise the cutting press 112, wait a predetermined period of time, and then begin to raise the transport arm and the flatbread stop 114. The flatbread cutting system 100 can begin to raise the aligner the predetermined period of time after beginning to raise the cutting press 112 or another predetermined period of time.

In some examples, the flatbread cutting system 100 can begin to raise the transport arm 106 before beginning to raise one or more of the other components. For instance, while the flatbread cutting system 100 moves the cutting press 112 to the lowered position, the flatbread cutting system 100 can raise, at least in part, the transport arm 106.

The flatbread cutting system 100 receives another flatbread stack 108 on the conveyor 110. For example, the flatbread cutting system 100 can receive the other flatbread stack 108 on the conveyor during any of the processes described with reference to FIGS. 1F-L. After receiving the other flatbread stack 108, the flatbread cutting system 100 can position the other flatbread stack 108 at position P1, e.g., above the lifting platform as shown in FIG. 1B. The flatbread cutting system 100 can raise the lifting platform 102, e.g., as described with reference to FIG. 1C.

The flatbread cutting system 100 can continue to process the other flatbread stack 108 as described above. For instance, the flatbread cutting system 100 can extend the transport arm 106 and move the other flatbread stack 108 from the lifting platform 102 and onto the transport arm 106, as described in more detail above.

Other types of flatbread cutting systems 100 can use the above described system, process, or both. For instance, a cracker cutting system can use the above described system and process to cut, e.g., rectangular, flatbread into crackers.

The flatbread cutting system 100 can have a mechanical or electronic control. For instance, the flatbread cutting system 100 can have one or more computers as electronic controls that control the operation of the flatbread cutting system 100.

One or more of the components described with reference to FIGS. 1A to 1L-2 can be coupled to a support frame included in the flatbread cutting system 100. For instance, the lifting platform 102, the transport arm 106, the conveyor 110, the cutting press 112, the aligner 116, or a combination of two or more of these, can be moveably coupled to the support frame. The cutting pedestal 104, the flatbread stop 114, or both, can be fixedly coupled to the support frame. The motors for the lifting platform 102, the transport arm 106, the conveyor 110, the cutting press 112, the aligner 116, or a combination of two or more of these, can be fixedly coupled to the support frame.

FIG. 2 is a flow diagram of an example process 200 for cutting flatbread pieces from a flatbread stack. For example, the process 200 can be used by the flatbread cutting system 100 described with reference to FIGS. 1A-L.

A flatbread cutting system raises, using a lifting platform with a first upper surface and in a first vertical direction along a vertical axis, a flatbread stack from a conveyor that transports the flatbread stack along a longitudinal axis that is substantially perpendicular to the vertical axis (202). For instance, the flatbread cutting system receives the flatbread stack on the conveyor, actuates the conveyor to move the flatbread stack along the longitudinal axis, and uses the first upper surface of the lifting platform to raise the flatbread stack from the conveyor.

The flatbread cutting system extends a transport arm that includes a second upper surface in a first direction along the longitudinal axis (204). The first direction can be a direction opposite a direction in which the conveyor moves the flatbread stack along the longitudinal axis.

The flatbread cutting system removes, with the second upper surface, the flatbread stack from the lifting platform (206). For instance, the flatbread cutting system lowers the lifting platform so that the first upper surface is below the second upper surface, and the second upper surface removes the flatbread stack from the lifting platform.

The flatbread cutting system places, with the transport arm, the flatbread stack on an upper pedestal surface of a cutting pedestal by retracting the transport arm in a second direction along the longitudinal axis (208). The flatbread cutting system can use a flatbread stop, an aligner, or both, along with the transport arm when placing the flatbread stack on the upper pedestal surface of the cutting pedestal.

The flatbread cutting system cuts, with a cutting press, one or more flatbread pieces from the flatbread stack while the upper pedestal surface of the cutting pedestal supports the flatbread stack (210). For example, the flatbread cutting system can cut all, substantially all, or one or more flatbread pieces from the flatbread stack.

In some implementations, the process 200 can include additional steps, fewer steps, or some of the steps can be divided into multiple steps. For example, the flatbread processing system can perform one or more steps described above with reference to FIGS. 1A-L as part of the process 200.

A number of implementations have been described. Nevertheless, it will be understood that various modifications may be made without departing from the spirit and scope of the disclosure. For example, various forms of the flows shown above may be used, with steps re-ordered, added, or removed.

Figure 3:
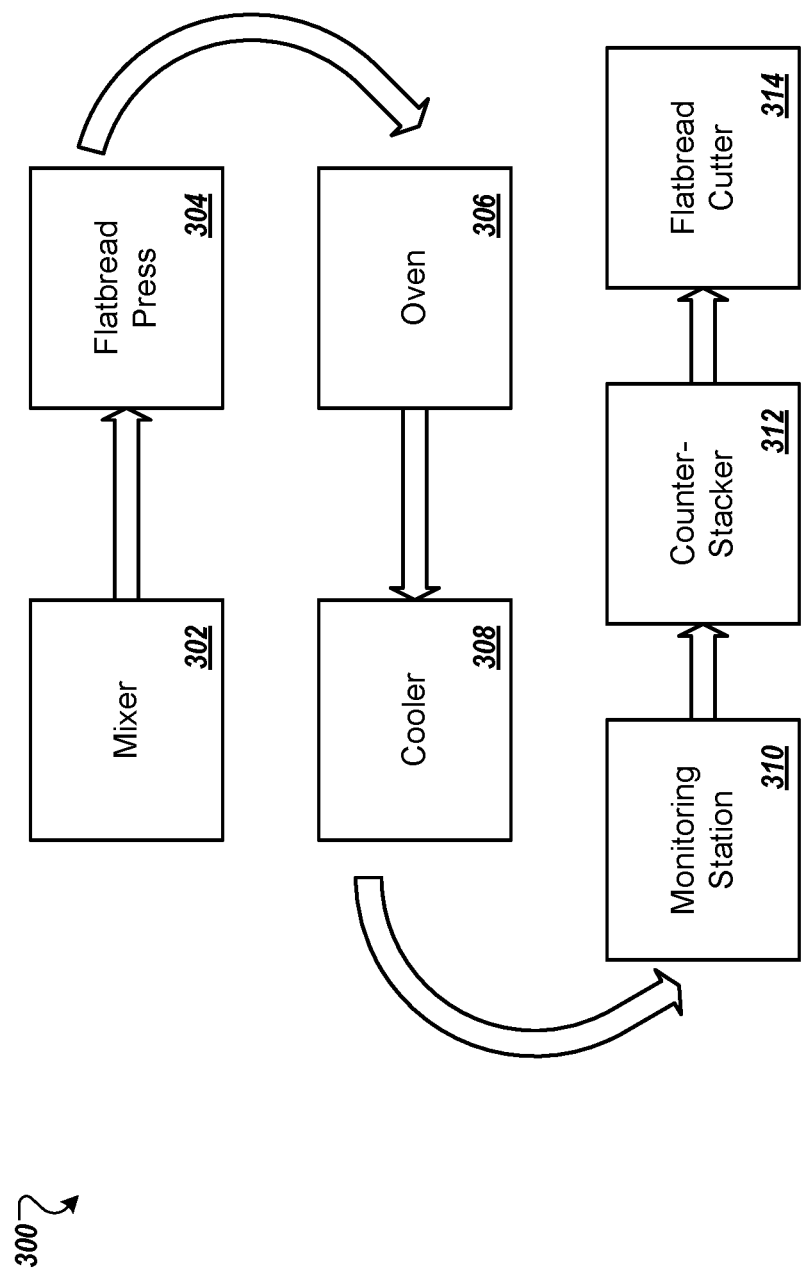
FIG. 3 depicts an example of some devices that can be included in a flatbread processing system.
Like reference numbers and designations in the various drawings indicate like elements.

FIG. 3 depicts an example of some devices that can be included in a flatbread processing system 300. The flatbread processing system 300 can be used to process the comestibles, e.g., flatbread, described above with reference to FIGS. 1A to 1L-2. The flatbread processing system 300 does not depict all devices that could be included in a system, depending on system configuration, such as a dough ball loader that forms balls of dough from batter created by a mixer 302 and places the dough balls on the flatbread press 304, e.g., a forming press, using a comestible loader. The flatbread processing system 300 provides an example for processing wheat comestibles, e.g., wheat tortillas.

In some implementations, the flatbread processing system 300 can process different types of comestibles. For instance, the flatbread processing system 300 can process corn comestibles, e.g., corn tortillas. In these implementations, the flatbread processing system 300 includes different devices, such as those used to make corn tortillas.

The flatbread processing system 300 includes a mixer 302. The mixer 302 combines multiple ingredients according to a process recipe. The mixer 302 mixes the multiple ingredients to create a dough batter.

The mixer 302 can be connected to a former (not shown) that creates dough balls from the batter created by the mixer 302. The former can place the dough balls in a dough ball loader that is configured according to a pressing pattern layout for the flatbread being made by the flatbread processing system 300. The former selects an amount of batter based on a threshold comestible size range for the dough balls, e.g., to create 10 inch tortillas or 8 inch tortillas. The threshold comestible size range can be a comestible parameter, e.g., specified by the process recipe.

The dough ball loader can place the dough balls on a conveyer included in the flatbread press 304. Once a dough ball is placed on a location on an upper surface of the conveyor for each of the locations in a pressing pattern layout, e.g., a 3×3 pressing pattern layout, the flatbread press 304 moves the conveyor forward to place the dough balls under the press. The flatbread press 304 then presses the dough balls. During the pressing operation, the flatbread press 304 can slightly bake the dough balls to increase a likelihood that the pressed dough balls will maintain their pressed shape.

The flatbread press 304 can then transfer the pressed dough balls to a discharge station included in the flatbread press 304. The discharge station can include a heater to parbake the pressed dough balls. Use of the discharge station can enable the flatbread press 304 to use a lower temperature during the pressing process.

The flatbread processing system 300 then transfers the pressed dough balls from the flatbread press 304 to an oven 306. The flatbread processing system 300 can use one or more conveyors to transfers the dough balls from the flatbread press 304 to the oven 306.

The oven 306 includes one or more oven conveyors that transfer the pressed dough balls through the oven 306 during a cooking process. As the one or more conveyors transfer the pressed dough balls through the oven 306, the pressed dough balls are cooked so that when the pressed dough balls exit the oven 306, the cooking process is likely complete. In some implementations, the pressed dough balls can proceed to another cooking process after removal from the oven 306.

After cooking, the flatbread processing system 300 can transfer the cooked, pressed dough balls onto one or more conveyors to transfer the pressed dough balls from the oven 306 to a cooler 308. In some implementations, the flatbread processing system 300 can use one or more conveyors that transfer the pressed dough balls to an upper portion of the cooler 308.

The cooler 308 can include multiple cooling conveyors that transport the pressed dough balls through the cooler 308. The cooler 308 can use any appropriate process, components, or both, to reduce the temperature of the pressed dough balls. For instance, as the pressed dough balls move through the cooler 308, air can move across the surfaces of the pressed dough balls to cool the pressed dough balls to a reduced temperature.

In some examples, the pressed dough balls can have a temperature close to 200° F. when entering the cooler 308. The cooler can include one or more fans to move air from an environment outside of the cooler 308 (e.g., at an ambient temperature between about 65 to about 80° F.) across the cooling conveyors and the pressed dough balls. As the air passes across the pressed dough balls, heat is removed from the pressed dough balls and the pressed dough balls are cooled.

The flatbread processing system 300 transfers the pressed dough balls from the cooler to a monitoring station 310. The monitoring station 310 can analyze one or more properties of the pressed dough balls, including the diameter and color. For instance, the monitoring station 310 can determine whether a pressed dough ball was burnt, conforms with size requirements for a process recipe for the pressing pattern, or both. In general, the monitoring station 310 can determine whether the pressed dough ball substantially conforms with one or more threshold comestible parameters for the process recipe.

The monitoring station 310 can include a dough ball removal device used to remove dough balls from the monitoring station 310 that do not conform to predetermined criteria for the recipe. For instance, the monitoring station can include one or more air blowers, e.g., one for each processing lane for the pressing pattern, to remove pressed dough balls that were overcooked, pressed too much, not pressed enough, or a combination of these.

The flatbread processing system 300 transfers the pressed dough balls that conform to the predetermine criteria to a counter-stacker 312. The counter-stacker 312 can create stacks of pressed dough balls based on a stack quantity identified in the recipe for the flatbread processing system 300.

The flatbread processing system 300 transfers stacks of pressed dough balls to a flatbread cutter 314. The flatbread cutter 314 can be the flatbread cutting system 100 described above with reference to FIGS. 1A to 1L-2.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

The invention claimed is:

1. A system comprising:
a lifting platform configured to move in a first direction to remove a flatbread stack from a conveyor along an axis, which conveyor transports the flatbread stack along a longitudinal axis that is substantially perpendicular to the axis;
a transport arm configured to a) move in a first direction along the longitudinal axis to remove the flatbread stack from the lifting platform, and b) move in a second direction along the longitudinal axis to place the flatbread stack on a cutting pedestal; and
the cutting pedestal configured to receive the flatbread stack from the transport arm and to support the flatbread stack for a subsequent cutting operation.

2. The system of claim 1, wherein the cutting pedestal comprises a flatbread stop with a concave inner surface configured to substantially align a central axis of the flatbread stack with a central axis of the cutting pedestal.

3. The system of claim 2, comprising an aligner configured to move the flatbread stack toward the concave inner surface of the flatbread stop and substantially align the flatbread stack with the central axis of the cutting pedestal while the flatbread stack is above the cutting pedestal.

4. The system of claim 1, comprising a cutting press configured to press the flatbread stack and cut one or more flatbread pieces from the flatbread stack while the flatbread stack is received on the cutting pedestal.

5. The system of claim 4, comprising a product catch configured to catch the cut one or more flatbread pieces.

6. The system of claim 1, comprising the conveyor configured to transport the flatbread stack along the longitudinal axis that is substantially perpendicular to the axis along which the lifting platform is configured to remove the flatbread stack from the conveyor.

7. The system of claim 1, wherein the cutting pedestal comprises a plurality of blades configured to cut one or more flatbread pieces from the flatbread stack.

8. The system of claim 6, wherein the lifting platform comprises two or more supports each of which is configured to pass through a corresponding aperture in the conveyor.

9. The system of claim 8, wherein:
the conveyor comprises three or more belts; and
each of the two or more supports is adapted to move upward along a corresponding axis between a corresponding pair of the three or more belts.

10. The system of claim 8, wherein:
the transport arm comprises two or more fingers each of which is configured to move in apertures between corresponding supports from the two or more supports in the lifting platform.

11. The system of claim 1, wherein:
the first direction comprises a first vertical direction; and
the transport arm is configured to move in a second vertical direction to place the flatbread stack on the cutting pedestal after removing the flatbread stack from the lifting platform.

12. The system of claim 11, wherein the transport arm is configured to move in the second vertical direction to place the flatbread stack on the cutting pedestal after at least partially moving in the second direction along the longitudinal axis.

13. The system of claim 11, comprising a flatbread stop:
that comprises a concave inner surface configured to substantially align a central axis of the flatbread stack with a central axis of the cutting pedestal; and
is configured to move substantially concurrently with the transport arm in the second vertical direction.

14. The system of claim 13, wherein the flatbread stop is configured to move in a first direction while the cutting pedestal supports the flatbread stack and before a cutting press cuts one or more flatbread pieces from the flatbread stack.

15. The system of claim 1, comprising a support frame coupled to the lifting platform, the transport arm, and the cutting pedestal.

16. The system of claim 1, wherein the cutting pedestal is configured to receive, on a flatbread piece on an upper pedestal surface, the flatbread stack from the transport arm.

17. The system of claim 16, wherein the transport arm is configured to move above the flatbread piece in the first direction along the longitudinal axis and remove the flatbread stack from the lifting platform.

18. The system of claim 1, comprising:
a flatbread stop configured to substantially align the flatbread stack with a central axis of the cutting pedestal; and
an aligner configured to move the flatbread stack toward the flatbread stop and align the flatbread stack with the central axis of the cutting pedestal.

19. The system of claim 18, wherein the transport arm is configured to:
partially retract in the second direction along the longitudinal axis to position the flatbread stack above the cutting pedestal;
after partially retracting, support the flatbread stack while the aligner moves the flatbread stack toward the flatbread stop and substantially aligns the flatbread stack with the central axis of the cutting pedestal; and
after supporting the flatbread stack, finish retracting in the second direction along the longitudinal axis to i) place the flatbread stack on the cutting pedestal and ii) place the transport arm outside an area substantially above the cutting pedestal.

20. A method comprising:
moving, by a lifting platform and in a first vertical direction along an axis, a flatbread stack from a conveyor that transports the flatbread stack along a longitudinal axis that is substantially perpendicular to the axis;
moving a transport arm in a first direction along the longitudinal axis;
removing, with the transport arm, the flatbread stack from the lifting platform;
placing, with the transport arm, the flatbread stack on a cutting pedestal by moving the transport arm in a second direction along the longitudinal axis; and
cutting, with a cutting press, one or more flatbread pieces from the flatbread stack while the cutting pedestal supports the flatbread stack.

21. A system comprising:
a lifting platform configured to move in a first direction to remove a flatbread stack from a conveyor along an axis;
a transport arm configured to a) move in a second direction to remove the flatbread stack from the lifting platform, and b) move in a third direction substantially opposite the second direction to move the flatbread stack over a receiving edge of a cutting pedestal and place the flatbread stack on the cutting pedestal;
the cutting pedestal having the receiving edge and an opposing edge opposite the receiving edge and configured to receive the flatbread stack from the transport arm and to support the flatbread stack for a subsequent cutting operation; and
an aligner configured to move the flatbread stack toward the opposing edge of the cutting pedestal.

22. The system of claim 21, comprising:
a flatbread stop adjacent to the opposing edge of the cutting pedestal and with a concave inner surface configured to substantially align a central axis of the flatbread stack with a central axis of the cutting pedestal when the flatbread stack is above the cutting pedestal, wherein:
the aligner is configured to move the flatbread stack toward the concave inner surface of the flatbread stop and substantially align the flatbread stack with the central axis of the cutting pedestal while the flatbread stack above the cutting pedestal.

23. The system of claim 21, wherein the aligner has a concave shape with an inner portion that contacts the flatbread stack to move the flatbread stack toward the opposing edge of the cutting pedestal.

24. The system of claim 21, wherein the cutting pedestal comprises a plurality of blades configured to cut one or more flatbread pieces from the flatbread stack.

25. The system of claim 21, comprising the conveyor configured to transport the flatbread stack along a longitudinal axis that is substantially perpendicular to the axis along which the lifting platform is configured to remove the flatbread stack from the conveyor.

26. The system of claim 25, wherein the lifting platform comprises two or more supports each of which is configured to pass through a corresponding aperture in the conveyor.

27. The system of claim 26, wherein:
the conveyor comprises three or more belts; and
each of the two or more supports is adapted to move upward along a corresponding axis between a corresponding pair of the three or more belts.

28. The system of claim 26, wherein:
the transport arm comprises two or more fingers each of which is configured to move in apertures between corresponding supports from the two or more supports in the lifting platform.

29. The system of claim 21, comprising a support frame coupled to the lifting platform, the transport arm, and the cutting pedestal.

30. The system of claim 1, wherein:
the cutting pedestal is configured to receive, on a flatbread piece on an upper pedestal surface, the flatbread stack from the transport arm; and
the transport arm is configured to move above the flatbread piece in the second direction and remove the flatbread stack from the lifting platform.

* * * * *

UNITED STATES PATENT AND TRADEMARK OFFICE
CERTIFICATE OF CORRECTION

PATENT NO. : 12,150,453 B2
APPLICATION NO. : 17/843110
DATED : November 26, 2024
INVENTOR(S) : Eric Clay Lawrence Page 1 of 1

It is certified that error appears in the above-identified patent and that said Letters Patent is hereby corrected as shown below:

On the Title Page (72), Column 1, Line 1, delete "Hungtington" and insert --Huntington--.

(73), Column 1, Line 1, delete "Lawrence Equipment, Inc." and insert --Lawrence Equipment Inc.--.

(56), Column 2, Lines 3-4, delete "<https://youtu.be/" and insert --<https://youtube/--.

Signed and Sealed this
Thirteenth Day of May, 2025

Coke Morgan Stewart
*Acting Director of the United States Patent and Trademark Office*